United States Patent
Doyle et al.

(10) Patent No.: US 11,441,961 B2
(45) Date of Patent: Sep. 13, 2022

(54) METHOD FOR FORMING PRESSURE SENSOR INVOLVES FILLING A CHAMBER WITH NON COMPRESSIBLE FLUID AND SHAPING ETCHED CLADDING TO CONVERT EXTERNAL PRESSURE WITHIN CHAMBER BY ANISOTROPIC STRESS

(71) Applicant: Halliburton Energy Services, Inc., Houston, TX (US)

(72) Inventors: Crispin Doyle, England (GB); Dirk Havermann, England (GB)

(73) Assignee: Halliburton Energy Services, Inc., Houston, TX (US)

( * ) Notice: Subject to any disclaimer, the term of this patent is extended or adjusted under 35 U.S.C. 154(b) by 344 days.

(21) Appl. No.: 16/753,165

(22) PCT Filed: Nov. 13, 2018

(86) PCT No.: PCT/GB2018/053268
§ 371 (c)(1),
(2) Date: Apr. 2, 2020

(87) PCT Pub. No.: WO2019/097213
PCT Pub. Date: May 23, 2019

(65) Prior Publication Data
US 2020/0249111 A1 Aug. 6, 2020

Related U.S. Application Data
(63) Continuation-in-part of application No. PCT/GB2018/053268, filed on Nov. 13, 2018.

(30) Foreign Application Priority Data
Nov. 20, 2017 (GB) ..................................... 1719132

(51) Int. Cl.
*G01L 11/02* (2006.01)
*G02B 6/02* (2006.01)

(52) U.S. Cl.
CPC ........ *G01L 11/025* (2013.01); *G02B 6/02076* (2013.01)

(58) Field of Classification Search
None
See application file for complete search history.

(56) References Cited

U.S. PATENT DOCUMENTS 5,841,131 A * 11/1998 Schroeder ............. G01L 11/025
 250/227.17
6,201,912 B1 * 3/2001 Kempen ................. G01D 5/344
 385/12

(Continued)

FOREIGN PATENT DOCUMENTS

| CN | 104407413 A | 3/2015 |
| GB | 2399877 A | 9/2004 |
| WO | 01/55688 A1 | 8/2001 |

OTHER PUBLICATIONS

International Search Report and Written Opinion issued in related PCT Application No. PCT/GB2018/053268 dated Feb. 11, 2018, 17 pages.

(Continued)

*Primary Examiner* — Peter J MacChiarolo
*Assistant Examiner* — Jermaine L Jenkins
(74) *Attorney, Agent, or Firm* — Kilpatrick Townsend & Stockton LLP

(57) ABSTRACT

A method for forming a pressure sensor is provided wherein an optical fibre is provided, the optical fibre comprising a core, a cladding surrounding the core, and a birefringence structure for inducing birefringence in the core. The birefringence structure comprises first and second holes enclosed within the cladding and extending parallel to the (Continued)

core. A portion of the optical fibre comprising of the core and the birefringence structure is encased within a chamber, wherein the chamber is defined by a housing comprising a pressure transfer element for equalising pressure between the inside and the outside of the housing. An optical sensor is provided along the core of the optical fibre. The cladding is internally etched by flowing an etchant through the first and second holes along a length of the portion of optical fibre which comprises the optical sensor so as to increase the width of the first and second holes. The chamber is filled with a substantially non-compressible fluid. Consequently, the etched cladding is shaped so as to convert an external pressure provided by the non-compressible fluid within the chamber to an anisotropic stress in the optical sensor.

28 Claims, 7 Drawing Sheets

(56) References Cited

U.S. PATENT DOCUMENTS

| | | | | |
|---|---|---|---|---|
| 6,490,931 | B1* | 12/2002 | Fernald | G01L 1/242 |
| | | | | 73/705 |
| 6,630,658 | B1* | 10/2003 | Bohnert | G01D 5/3538 |
| | | | | 250/227.16 |
| 7,308,162 | B2* | 12/2007 | Wang | G01L 1/242 |
| | | | | 385/12 |
| 7,963,170 | B2* | 6/2011 | Kramer | G01L 1/241 |
| | | | | 73/705 |
| 8,849,073 | B2* | 9/2014 | Vigneaux | G02B 6/0238 |
| | | | | 385/13 |
| 9,329,334 | B2* | 5/2016 | Maida, Jr. | G01L 1/242 |
| 9,453,771 | B2* | 9/2016 | Udd | G02B 6/022 |
| 10,557,343 | B2* | 2/2020 | Wilson | G01L 19/0627 |
| 2004/0037485 | A1* | 2/2004 | Kersey | G01D 5/35383 |
| | | | | 385/12 |
| 2007/0177846 | A1 | 8/2007 | Chen et al. | |

OTHER PUBLICATIONS

Amended International Preliminary Report on Patentability issued in related PCT Application No. PCT/GB2018/053268 dated Dec. 12, 2019,17 pages.

Zhang, Qi, et al. "Fiber-optic refractometer based on a phase-shifted fiber Bragg grating on a side-hole fiber." Optics express 23.13 (2015): 16750-16759.

* cited by examiner

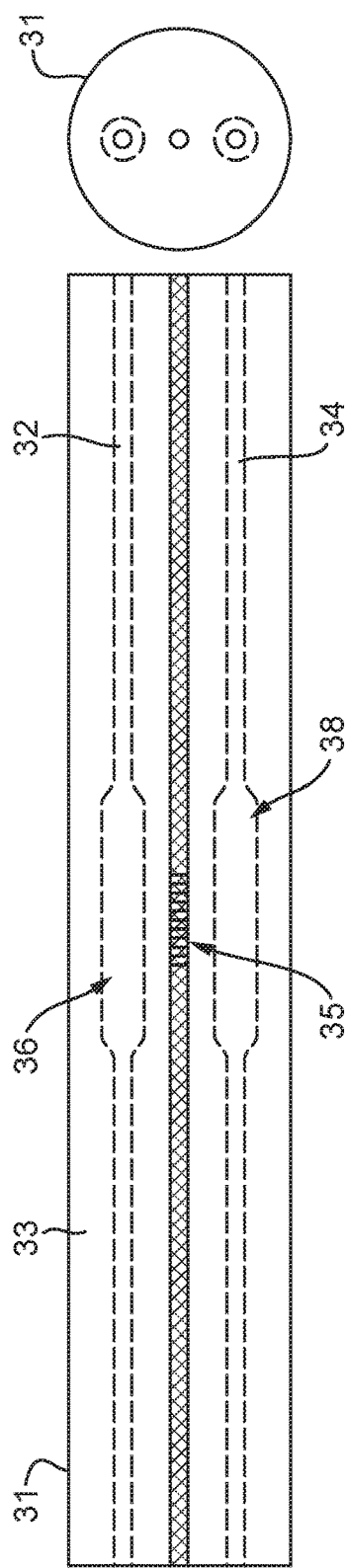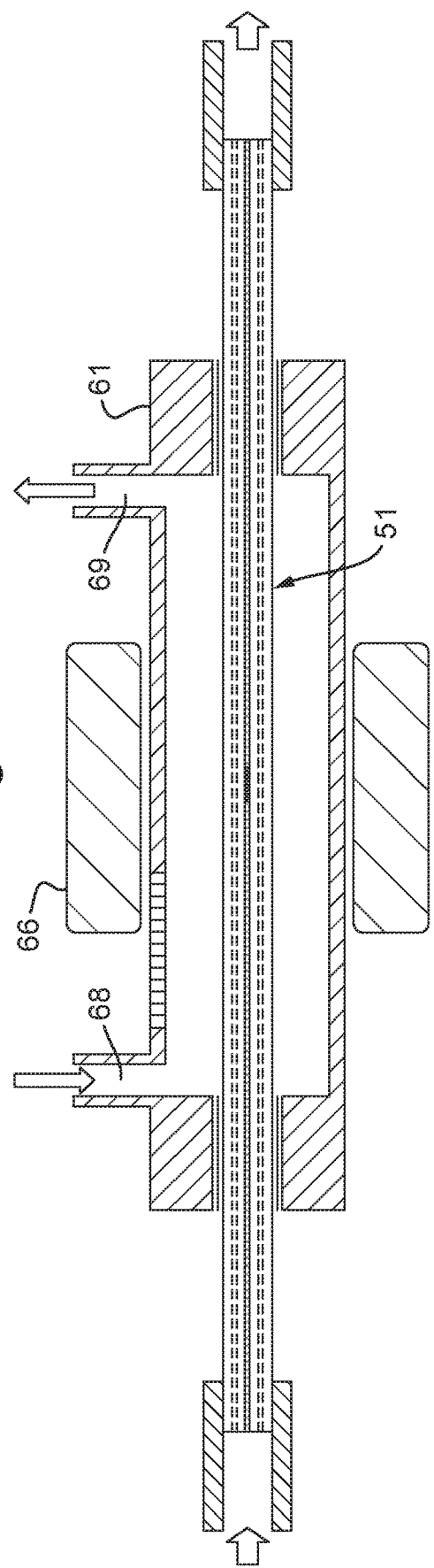

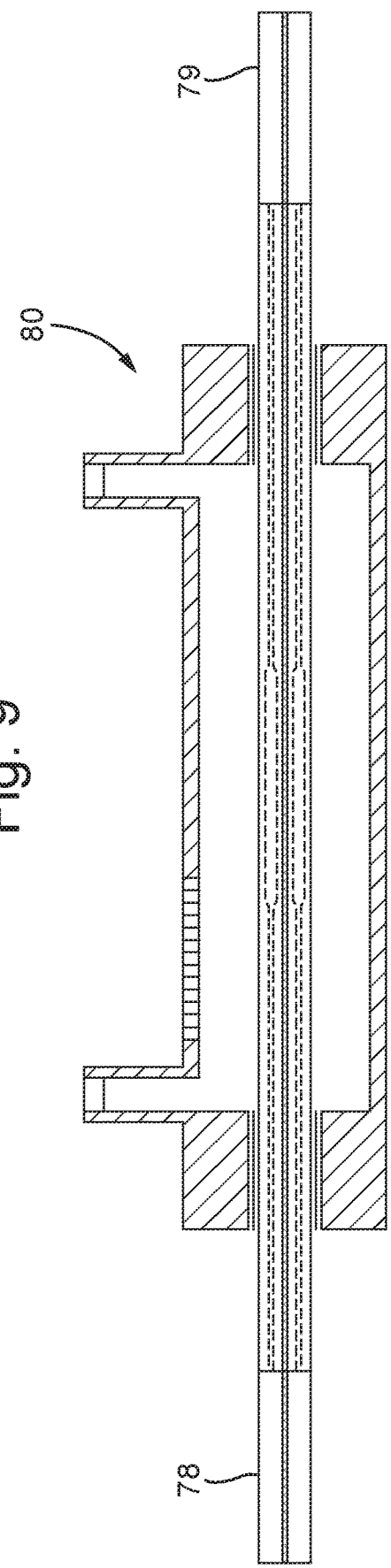

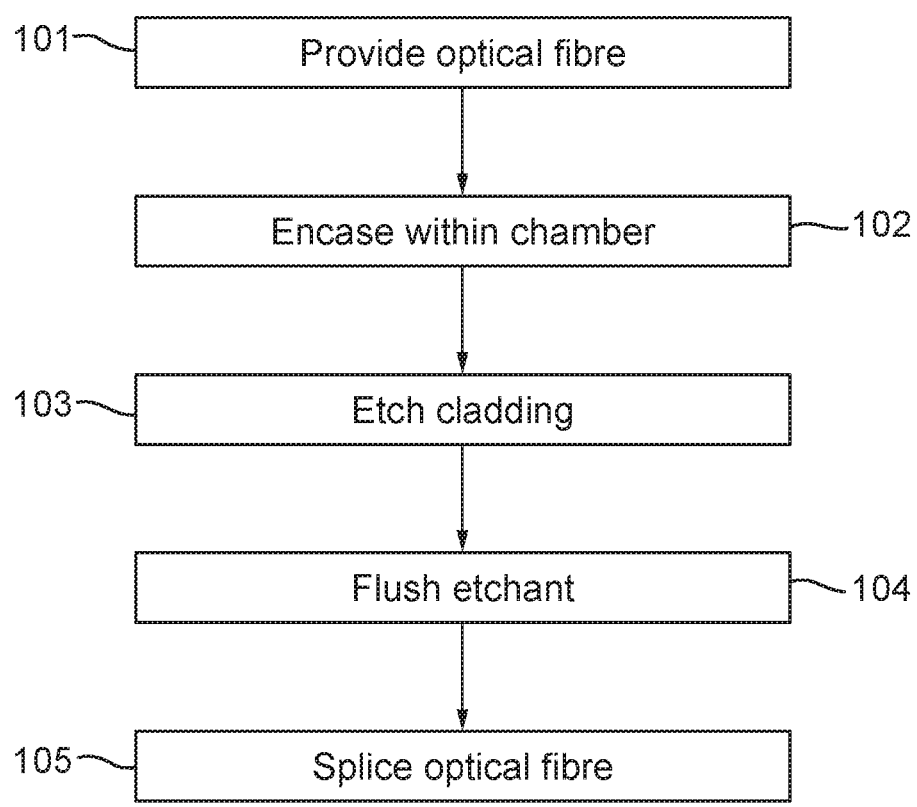

METHOD FOR FORMING PRESSURE SENSOR INVOLVES FILLING A CHAMBER WITH NON COMPRESSIBLE FLUID AND SHAPING ETCHED CLADDING TO CONVERT EXTERNAL PRESSURE WITHIN CHAMBER BY ANISOTROPIC STRESS

CROSS-REFERENCE TO RELATED APPLICATION

The present application is a U.S. National Stage Application of International Application No. PCT/GB2018/053268 filed Nov. 13, 2018, which claims priority to Great Britain Patent Application No. 1719132.1 filed Nov. 20, 2017, both of which are incorporated herein by reference in their entirety for all purposes.

FIELD OF THE INVENTION

The present invention relates to an optical fibre-based pressure sensor, a method for forming the pressure sensor and a system for monitoring pressure.

BACKGROUND TO THE INVENTION

Pressure is an important measurand to acquire when determining the status of a hydrocarbon reservoir and managing it effectively. Pressure sensors may be of a variety of types, each of which has its own advantages and disadvantages. A common type of sensor for downhole pressure measurement is the resonant quartz transducer. These devices can deliver excellent metrology performance and stability but their reliability is limited at high temperatures. These sensors are also expensive and it is difficult to deploy many of them within a hydrocarbon well because each one typically requires its own cable for power and data transmission. Each of these cables forms a penetration through surface and sub-surface pressure barriers, which increases the number of potential leak points within the high pressure environment.

Optical fibre-based sensors have the potential to be more reliable at higher operating temperatures since they do not require local electronics to operate in the harsh downhole environment. For example, these sensors may remain operational at pressures up to and in excess of 200 MPa and temperatures up to and in excess of 350 degrees Celsius. An additional benefit of some types of fibre-optic sensor is that several can be multiplexed on one cable, thereby reducing the number of cables required. Furthermore the absence of conditioning electronics in such sensors allows the pressure sensors to be made smaller, thereby facilitating their deployment in more downhole locations.

It is known to use a Fibre Bragg Grating (FBG) within a fibre-optic pressure sensor. An FBG is an intrinsic optical sensor recorded within the core of an optical fibre using spatially-varying patterns of intense ultraviolet or infrared laser light to create periodic modulations in a refractive index of the fibre. These modulations in the refractive index give rise to a wavelength selective mirror, whereby light travelling down the waveguide is partially reflected at each of the interfaces or gratings, whilst the remaining light is transmitted through the sensor. Maximum reflectivity occurs at the Bragg wavelength, which is a property of the FBG and is dependent on both the periodicity of the refractive index and the effective refractive index of the waveguide. Changes in the temperature, pressure or strain at the sensor can give rise to a change in each of the periodicity and the refractive index, thus leading to a detectable change in the Bragg wavelength.

For some fibre-optic pressure sensors which utilise FBGs, the fibre is designed so that a uniform external pressure applied to the fibre is converted into an anisotropic force in the core of the waveguide. The effect of this is to induce pressure-dependent birefringence in the core. This birefringence causes the reflection peak of the FBG to split in two such that the separation of the peaks is only a function of pressure. An early example of this is discussed in U.S. Pat. No. 5,841,131, in which a cylindrical waveguide is modified by the addition of holes or other features extending parallel to the core so as to induce birefringence. The birefringent fibre is then spliced onto a normal sized single mode fibre to form the pressure sensor.

There remains a need for sensors to operate at higher pressures and temperatures and above all, for the cost and size of these devices to be reduced while maintaining mechanical robustness, excellent reliability, sensitivity and measurement performance. The present invention seeks to address these problems.

SUMMARY OF THE INVENTION

A first aspect of the invention provides a method for forming a pressure sensor comprising:
  providing an optical fibre comprising a core, a cladding surrounding the core, and a birefringence structure for inducing birefringence in the core, wherein the birefringence structure comprises first and second holes enclosed within the cladding and extending parallel to the core;
  encasing a portion of the optical fibre comprising the core and the birefringence structure within a chamber, wherein the chamber is defined by a housing comprising a pressure transfer element for equalising pressure between the inside and the outside of the chamber;
  providing an optical sensor along the core of the portion of optical fibre;
  internally etching the cladding by flowing an etchant through the first and second holes along a length of the portion of optical fibre which comprises the optical sensor so as to increase the width of the first and second holes; and
  filling the chamber with a substantially non-compressible fluid;
  wherein the etched cladding is shaped so as to convert an external pressure provided by the non-compressible fluid within the chamber to an anisotropic stress in the optical sensor.

The pressure transfer element enables hydrostatic pressure acting on the outside of the housing to be transmitted into the inside of the chamber. The birefringence structure causes this pressure to be converted into anisotropic stress at the core of the optical fibre. In particular, strong variations in the stress and hence the refractive index are achieved in response to a change in the pressure applied to the chamber. As a result, when light is transmitted along the core, it will typically be reflected by the optical sensor at two different characteristic wavelengths, typically corresponding to respective peak wavelengths. The pressure at the sensor may then be calculated from the difference between these wavelengths.

Internally etching the cladding increases the width of the first and second holes in a direction perpendicular to the axis of the first and second holes. This in turn increases the amount by which the birefringence changes at the optical sensor in response to changes in pressure (referred to herein as the "birefringence sensitivity"). Ten-fold increases in the sensitivity of the pressure sensor may be achieved according to this technique compared with if no internal etching had been performed.

The presence of the first and second holes and their subsequent enlargement reduces the cross-sectional area of the optical fibre and so may make it more fragile and liable to break. Advantageously therefore, the cladding is etched in situ within the housing that later forms part of the pressure sensor. This housing supports the fibre during the internal etching and protects the etched fibre thereafter. More cladding material can therefore be removed according to this technique because the fibre does not need to be strong enough to withstand any kind of bending or stretching that may occur during handling. When the pressure sensor is formed, the load exerted by the non-compressible fluid can be controlled, for example by setting a maximum operating pressure for the pressure sensor.

The step of providing an optical sensor along the core of the portion of optical fibre may occur before or after the portion of optical fibre has been encased in the housing, as well as before or after etching. For example, if the optical sensor is provided before said encasement then it is formed at a location on the optical fibre corresponding to the encased portion of optical fibre. Typically the optical sensor is a Fibre Bragg Grating (FBG) however other optical sensors such as Long-Period Gratings, blazed or chirped fibre Bragg gratings, interferometric, spectroscopic or intensity-based sensors are also envisaged.

Typically the step of filling the chamber with a substantially non-compressible fluid forms the pressure sensor. For example this may occur after all etching processes have occurred and whilst the portion of optical fibre is encased within the housing. The substantially non-compressible fluid acts as a pressure transfer medium between the pressure transfer element and the optical fibre. The chamber is typically filled or substantially filled with liquid at this point to achieve this pressure transfer. The substantially non-compressible fluid may comprise any of the following: mineral oil, silicone oil, grease or a liquid metal based on gallium or indium and their alloys.

The first and second holes preferably remain enclosed within the cladding after the internal etching. Thus the cladding is not etched by the liquid etchant to the extent so that the first and second holes become exposed. The first and second holes may therefore remain internally formed within the cladding both before and after the internal etching.

In some instances it is desirable to increase the birefringence sensitivity within one or more regions of the encased portion of optical fibre, for example those surrounding any optical sensors. This may be achieved by targeted heating of the etching fluid so as to increasing the etching rate in these regions. Preferably therefore the method further comprises heating the cladding during the internal etching using a localised heat source. Typically the localised heat source comprises a resistive coil, a Peltier heater or an induction coil. An electric current may be applied to this resistive coil to generate heat at certain regions surrounding the optical fibre through ohmic heating. Other localised heat sources are also envisaged, including a laser. For example a light source used to form the optical sensor may also be used to heat the cladding during the internal etching. Typically a liquid etchant comprising a mixture of aquesous solutions of ammonium fluoride and hydrofluoric acid, such as Buffered Oxide Etch, is used in combination with this heating method. Such etchants provide a predictable increase in the etching rate in response to changes in temperature.

The birefringent structure enables a uniform external pressure applied to the outside of the cladding to be converted into anisotropic forces in the core of the waveguide. In order to help create these anisotropic forces, the axes of the core and the first and second holes may lie within a common plane. Typically the first hole is provided on the opposing side of the core from the second hole.

Further increases in the birefringence sensitivity may be achieved by providing additional features to the birefringence structure. It is particularly desirable that the birefringence structure further comprises third and fourth holes enclosed within the cladding and extending parallel to the core. The method may then further comprise externally etching the cladding along a length of the portion of optical fibre which comprises the optical sensor so as to expose the third and fourth holes.

An improved process for producing a pressure sensor may therefore be provided wherein further etching is applied to the cladding, in particular to the outside of the cladding, to lead to further increases in the birefringence sensitivity. Furthermore, the external etching step, which changes the profile of the fibre, is performed after the sensor has been incorporated into a protective housing. This reduces the risk of mechanical damage during construction since the etched optical fibre does not need to be handled. A good optical coupling is also maintained because the externally etched length of the optical fibre is not directly spliced onto another fibre. External etching may instead occur within an internal chamber of the housing that later forms part of the pressure sensor. An end of the optical fibre that has not been externally etched and which trails from the housing may instead be spliced onto a similarly shaped fibre, if needed. This is easier to achieve without the optical fibre breaking and whilst maintaining a good optical coupling than a process of splicing two differently shaped optical fibres together. Furthermore, the chamber provides a dual purpose of providing a volume for containing the etchant during external etching and providing a volume for containing the substantially non-compressible fluid. This further simplifies the method of manufacture for the pressure sensor.

Selective removal of the cladding through external and internal etching results in external hydrostatic pressure provided by the non-compressible fluid being converted into changes in the degree of anisotropy of stress in the core. This changes the birefringence at the optical sensor. For example, an increase in anisotropic stress may increase the birefringence at the optical sensor. The third hole is typically provided on an opposing side of the core from the fourth hole. If the etching were to significantly erode the cladding between one or each of the third and fourth holes and the core then the core could become damaged thereby affecting its optical transmission properties. The external etching may hence be controlled so as to expose the third and fourth holes without significantly removing the cladding between each of the third and fourth holes. Typically therefore the perimeter of the externally etched cladding may comprise a partial outline of the third and fourth holes. For example, the externally etched cladding may have a cross-sectional outline, as viewed along the core, in the form of a bow tie. The etching may therefore be limited so as to avoid removing too much cladding from the optical fibre.

The external etching may be performed using laser ablation. Targeted removal of the cladding can therefore be achieved at localised areas on the fibre. This enables the production of certain etched shapes in the cross section of the fibre which are particularly desirable for inducing birefringence. The housing may therefore comprise a window for transmitting a laser beam directed onto the length of the portion of optical fibre.

Alternatively the external etching may comprise flowing an etching fluid into the chamber and immersing the outside of the cladding in said etching fluid until the third and fourth holes are exposed. Unlike laser ablation, this process will typically remove an equal amount of cladding around the outside of the cladding, as the optical fibre inside the chamber is immersed in the etching fluid. Other desirable shapes of optical fibre for inducing birefringence may be produced according to this technique. In this approach the method preferably further comprises flushing the etching fluid from the chamber prior to filling the chamber with the substantially non-compressible fluid. For example, the substantially non-compressible fluid may be injected into an inlet of the housing so as to expel the etchant from the chamber until said chamber is filled with the substantially non-compressible fluid. This process may prevent any unwanted etching due to the presence of residual etching fluid in the chamber.

The axes of the core and the first and second holes preferably lie within a first plane, and the axes of the core and the third and fourth holes preferably lie within a second plane, wherein the second plane is different from, and preferably perpendicular to, the first plane. The optical fibre may therefore have two mirror planes: one which extends along the first plane and perpendicular to the axis of the core; and another which extends along the second plane and perpendicular to the core. The amount of cladding surrounding the core may be different along both of these mirror planes. The compression forces acting on the optical sensor along these two lines will therefore be different. Desirable levels of birefringence may hence be induced.

Optionally, the sensitivity to pressure may be further increased wherein the birefringence structure further comprises one or more additional holes enclosed within the cladding and extending parallel to the core, wherein the additional holes remain enclosed within the cladding after said internal and external etching.

In another desirable implementation the birefringence structure further comprises third and fourth holes that are enclosed within the cladding and which extend parallel to the core, wherein the core is arranged between the first hole and the second hole and between the third hole and the fourth hole. Typically the first and second holes and the core are arranged along a first plane, and the third and fourth holes and the core are arranged along a second plane (as before). However, internally etching the cladding may cause the first hole to merge with the fourth hole and the second hole to merge with the third hole. The resulting etched holes may both be dumbbell shaped along the portion of the fibre encompassing the optical sensor when viewed in a plane having a normal parallel to the core. This is achieved by the removal of cladding between the first and fourth holes and the removal of cladding between the second and third holes. For example, the internally etching process may further comprise flowing an etchant through the third and fourth holes along a length of the portion of optical fibre which comprises the optical sensor. The internal etching may therefore give rise to a non-circular shaped void surrounding the optical sensor for inducing birefringence in the optical sensor. Such a structure can be used to produce pressure sensors having a particularly high sensitivity to changes in pressure.

The core itself may be pre-formed to exhibit birefringence. For example, an elliptical core could be used. The birefringence structure may then further increase the birefringence at the core in response to changes in pressure applied to the optical fibre by the non-compressible fluid.

The method may further comprise splicing one or each end of the optical fibre protruding from the housing with a respective single-mode optical fibre. Such single-mode fibres are commonly used for transmitting signals reliably over long distances at minimal cost. This single-mode optical fibre may then be connected to a light source and/or detector as part of a system for monitoring pressure. Optionally, any of the holes may be closed by splicing an end of the optical fibre containing said holes on a section of solid fibre, or by using a flame or electric arc or other suitable heat source to fuse and collapse an end of the optical fibre containing said holes.

Further aspects of the invention will now be discussed. These share similar advantages and features as discussed in relation to the first aspect.

A second aspect of the invention provides a pressure sensor comprising:
   a housing defining a chamber, the housing comprising a pressure transfer element for equalising pressure between the inside and the outside of the chamber;
   a substantially non-compressible fluid contained within the chamber; and
   an optical fibre, wherein a portion of the optical fibre is encased within the chamber, the portion comprising a core, an optical sensor provided along the core, a cladding surrounding the core, and a birefringence structure for inducing birefringence in the core, wherein the birefringence structure comprises first and second holes enclosed within the cladding and extending parallel to the core and wherein the first and second holes have a larger cross sectional area along a region of the portion encompassing the optical sensor than along another region of the portion not encompassing the optical sensor.

As discussed in relation to the first aspect, the cladding is hence shaped so as to convert an external pressure provided by the non-compressible fluid within the chamber to an anisotropic stress on the optical sensor. Birefringence may then be induced or changed at the optical sensor in response to changes in pressure provided by the non-compressible fluid. This can be used to monitor the pressure acting on the pressure transfer element.

The first and second holes have a larger cross sectional area along a region of the portion encompassing the optical sensor than along another region of the portion not encompassing the optical sensor. This larger cross sectional area (measured perpendicular to the axis of the holes) typically results from targeted internal etching, for example due to localised heating during the etching process (as earlier discussed). An enlarged void may hence be provided within each of the first and second holes along a specific region that encompasses the optical sensor. The birefringence is consequently increased at these regions, without compromising the structural integrity of the remainder of the optical fibre. The enlarged voids are typically provided between two regions of the first and second holes having a comparatively smaller cross sectional area (the fibre being more stable in these regions). In one example, the diameter of the first and second holes may be at least 45 micrometres throughout the region of the portion of optical fibre encompassing the optical sensor and at most 25 micrometres either side of this region.

The pressure sensor preferably further comprises an etching member for enabling etching of the cladding within the chamber. Typically this etching relates to the external etching earlier discussed. For example, the etching member may comprise a conduit configured to enable a flow of etchant to and from the chamber. Alternatively it could be a window so as to enable a laser provided outside of the housing to direct a laser beam onto the cladding.

Preferably, the cladding within the encased portion of optical fibre has a non-elliptical (including non-circular) outline as viewed in a plane having a normal parallel to the axis of the core. This is typically the case where external etching of the cladding has occurred. This outline may comprise two re-entrant features. These re-entrant features may correspond to the exposed third and fourth holes earlier discussed.

Typically, the optical fibre protrudes from one or each end of the encased portion. This end may be coupled to a light source and/or detector, typically via a single-mode optical fibre.

The pressure transfer element is preferably a flexible member, such as a diaphragm or bellows. The flexible member may thus form part of the walls of the housing. For example, the housing may comprise an elongate portion, such as a tube, wherein the flexible member is provided on an end of the elongate portion. Alternatively, the pressure transfer element may be an orifice. The orifice may hence expose the substantially non-compressible fluid to any fluid that surrounds the outside of the housing, such as a process fluid. Typically the substantially non-compressible fluid will then be chosen so as to be immiscible with the surrounding fluid. Pressure transfer may hence take place across the orifice, at the liquid interface, without the need for a physical barrier to separate the process fluid and the substantially non-compressible fluid. The remainder of the housing may then be substantially inflexible such that pressure is transferred between the inside and the outside of the chamber via the pressure transfer element only.

A third aspect of the invention provides a system for monitoring pressure comprising:
  a pressure sensor according to the second aspect;
  a light source optically coupled to the encased portion of optical fibre; and
  a detector configured to receive light transmitted by the light source along the optical fibre.

The light source may direct linearly polarised light into the optical fibre. When the light reaches the birefringent portion of optical fibre it will propagate in two different modes that travel at different velocities. This light will then interact with the optical sensor, typically by reflecting or absorbing a proportion of the incident light. Typically the detector will be arranged to detect the light which is reflected by the optical sensor. The birefringence causes two reflected signals or "peaks" to be detected at different wavelengths. Taking the example of where the optical sensor is an FBG, the wavelength of light reflected from the FBG is given by $\lambda_B = 2nd$, wherein n is the effective refractive index and d is the grating period. The difference in wavelength between the two peaks hence occurs because the birefringence causes a difference in the effective refractive index between the two modes whereas the grating period stays constant. If the temperature of the pressure sensor changes, the peaks will wavelength of the peaks will move along a common direction by substantially the same amount. However, if the pressure acting on the pressure sensor changes then the difference in wavelength between these two peaks will also change. The system can be used to monitor the pressure from this change in wavelength. Advantageously, the system is more sensitive to changes in pressure than prior art fibre-optic pressure sensors.

For these reasons, the optical sensor is preferably configured to simultaneously reflect light at two peak wavelengths, and the detector is preferably configured to monitor the pressure of the non-compressible fluid from the difference between the two peak wavelengths. Optionally multiple said pressure sensors are multiplexed onto the optical fibre so as to provide several pressure measurements along a single cable.

BRIEF DESCRIPTION OF THE DRAWINGS

Embodiments of the invention will now be discussed with reference to the accompanying drawings in which:

FIG. 7 is a cross-sectional illustration of a side view and an end view of an optical fibre after internal etching in accordance with the second embodiment;

FIG. 8 is a cross sectional illustration of a side view of an optical fibre during internal and external etching in accordance with a third embodiment;

FIG. 9 is a cross-sectional illustration of a side view of the pressure sensor in accordance with the third embodiment;

FIG. 14 is a flow diagram illustrating a method for forming a pressure sensor in accordance with the first embodiment.

DETAILED DESCRIPTION

Figure 1:
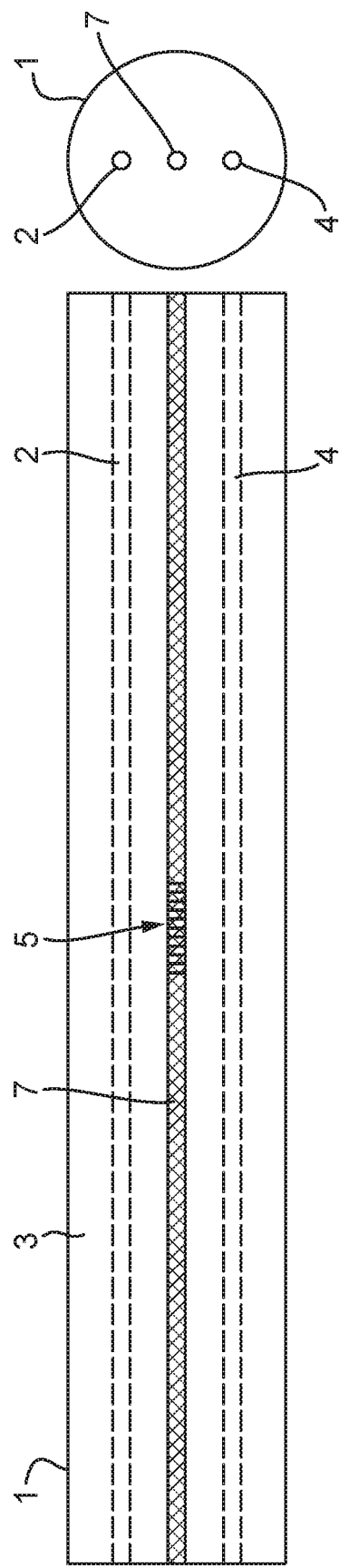
FIG. 1 is a cross-sectional illustration of a side view and an end view of an optical fibre in accordance with a first embodiment prior to internal etching.

A first embodiment of a method for forming a pressure sensor 10 will now be discussed with reference to FIGS. 1-5 and 14. The method begins at step 101 (FIG. 14) when a waveguide in the form of an optical fibre 1 is provided. The optical fibre 1 is constructed from a cylindrical preform (not shown) having a core and a cladding which surrounds the core. The preform typically has a diameter of 3-6 cm and may be 0.5-2 m in length (although other sizes are also possible). A pair of parallel holes is drilled into the cladding of the pre-form, typically 1-2 cm either side of the core. Optionally, silica glass tubes may be inserted into the holes of the preform after drilling. The pre-form is then drawn to form the optical fibre 1 shown in FIG. 1 using standard drawing techniques. The silica glass tubes (if provided) will then become amalgamated with the surrounding material of the preform during this process, whilst preserving the presence of the holes.

If the holes which are drilled into the pre-form are too large then they will collapse during the drawing process. Care is taken therefore to avoid this. An optical sensor in the form of a Fibre Bragg Grating (FBG) 5 is then formed along the core 7 by directing spatially-varying patterns of ultraviolet or infrared light onto the core 7. A photosensitive core 7, such as a germanium-doped silica fibre, is used such that the ultraviolet light creates systematic variations in the refractive index of the core 7.

Figure 3:
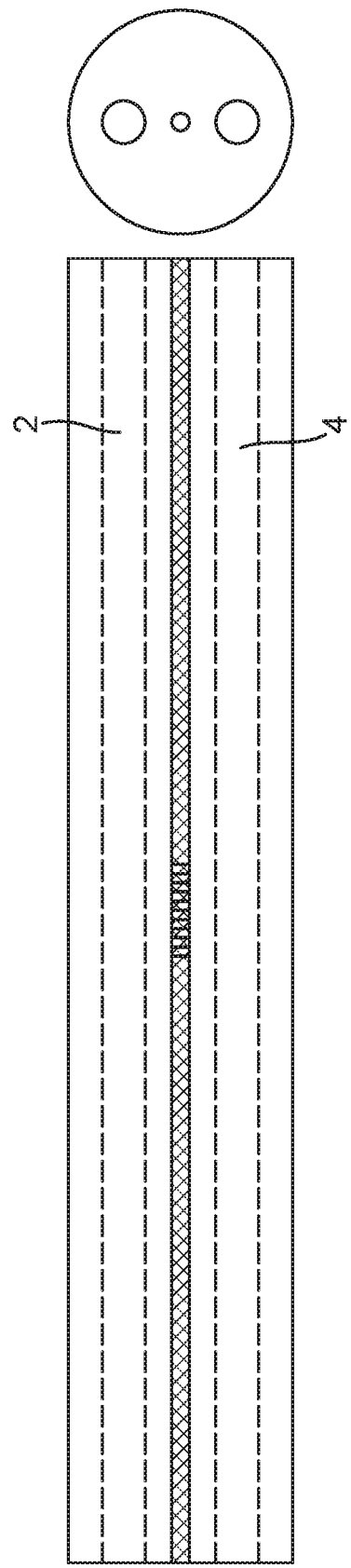
FIG. 3 is a cross-sectional illustration of a side view and an end view of an optical fibre after internal etching in accordance with the first embodiment.

The first and second holes 2, 4 are cylindrical voids within the cladding 3 which form part of a birefringence structure for inducing birefringence within the core 7. These holes 2, 4 extend parallel to the core 7, on opposing sides of the core 7, and at approximately equal distances from the core 7. This is illustrated by FIGS. 1 and 3, which show a cross-sectional side view of a section of the optical fibre 1 to the left and a cross-sectional end view of the optical fibre 1 to the right. The optical fibre 1 has a nominal 125 micrometre diameter. The core 7 has a diameter of 10 micrometres. The first and second holes 2, 4 also each have a diameter of 10 micrometres and are axially displaced from the central axis of the core 7 by 20-30 micrometres. Larger diameters holes may also be used, for example in the range of 10-20 micrometres however typically the diameter of the holes and their spacing from the core 7 will be chosen according to the diameter of the cladding 3. For example, if a larger cladding with a diameter of 280 micrometres is used, 20 micrometre diameter holes may be chosen each separated by 100 micrometres from the core.

Figure 2:
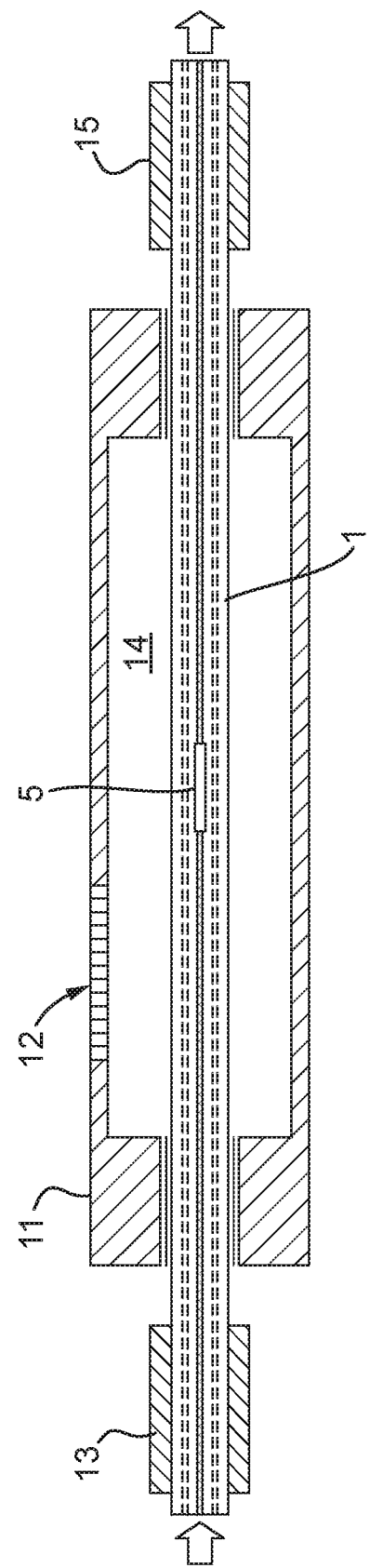
FIG. 2 is a cross-sectional illustration of a side view of an optical fibre during internal etching in accordance with the first embodiment.

At step 102 a portion of the length of optical fibre 1 is encased within a chamber defined by an elongate housing 11. This is shown by FIG. 2, wherein the housing 11 is substantially cylindrical and forms a sleeve. In the first embodiment the portion of optical fibre 1 that is encased within the housing 11 already contains the FBG 5 inscribed to it however in other embodiments the FBG 5 may be written onto the optical fibre 1 only once the optical fibre 1 has been encased within the housing 11. The housing 11 may therefore comprise a window in such embodiments so as to enable an external light source, such as a laser to write the FBG 5 onto the optical fibre 1.

The optical fibre 1 is held taut between apertures provided on opposing ends of the housing 11 by clamps 13, 15 so as to extend through the chamber. The housing 11 thus fixes the length of the portion of optical fibre 1 that is contained encased so as to protect against differential thermal expansion effects on the optical fibre 1.

The housing 11 is sealed at the opposing apertures through which the optical fibre 1 extends. The seals may be formed of an epoxy resin. In the event that the optical fibre 1 is metal-coated, a metal-to-metal seal may be applied for example by soldering or brazing. Suitable sealant materials include stainless steels, nickel alloys, gold-based solders and brass. Optionally, a glass-to-metal seal may be applied, for example by the use of a glass mixture having a lower melting point than the cladding 3 and the housing 11. A substantially non-compressible fluid 14 is then introduced to the chamber using one or more ports (not shown). The fluid 14 could be one of a variety of inert liquid. Suitable examples include mineral oil, silicone oil, grease or a liquid metal based on gallium or indium and their alloys. In other examples this fluid 14 is introduced to the chamber before the portion of optical fibre 1 is encased within the housing 11.

The housing 11 is formed of a corrosion resistant alloy, such as Inconel (RTM), capable of resisting the harsh environments found within a well of a hydrocarbon reserve. The housing 11 comprises a pressure transfer element in the form of a flexible diaphragm 12 that forms part of the walls surrounding the optical fibre 1. The diaphragm 12 may be located anywhere along the housing 11 so as to form a barrier between the fluid 14 contained within and any surrounding fluids that are outside of the housing 11. In the present embodiment the diaphragm 12 forms a discrete part of the walls of the housing 11 however the diaphragm 12 may alternatively fully surround the encased portion of optical fibre 1. The diaphragm 12 is typically formed of a corrosion resistant flexible material and so may comprise the same material as the remainder of the housing 11 (e.g. Inconel (RTM)), albeit made sufficiently thin so as to flex without breaking under normal operating conditions. The diaphragm 12 is configured to flex so as to transmit a hydrostatic pressure applied to the outside of the housing 11 into the fluid 14 so as to equalise the hydrostatic pressure on opposing sides of the diaphragm 12. In other embodiments bellows may be used instead of the diaphragm 12. Alternatively, the pressure transfer element may take the form of an aperture which is open so as to expose the substantially non-compressible fluid 14 to any surrounding process fluid. In this case, a substantially non-compressible fluid 14 may be used which is immiscible with the surrounding process fluid.

The housing 11 may be constructed so as to isolate the encased portion of optical fibre 1 from any axial stresses caused by thermal expansion of the housing 11. For example, the housing 11 may be further formed of one or more low-expansion materials (such as Invar (RTM), other nickel-iron alloys, Kovar (RTM) or a carbon fibre composite). Alternatively, the portion of optical fibre 1 may be held slightly slack between opposing ends of the chamber so as to compensate from any axial expansion of the chamber. Such axial stresses would not typically affect any pressure measurements however they could interfere with any temperature measurements obtained using the FBG 5.

At step 103, with the portion of optical fibre 1 encased within the housing 11, an etching process is performed. In the first embodiment the optical fibre 1 is etched internally only. A liquid etchant is flowed through the first and second holes 2, 4 through the portion of optical fibre 1 encased within the housing and along the direction indicated by the rightward pointing arrows in FIG. 2. The liquid etchant may be an aqueous solution of hydrofluoric acid, although a more controllable option is the Buffered Oxide Etch (BOE)—which is a mixture of aqueous solutions of ammonium fluoride and hydrofluoric acid. The use of BOE is particularly advantageous because it maintains its activity as it is used, thus it allows for a consistent etching rate.

The etchant will etch the cladding 3 at a predictable rate so as to increase the diameter of the first and second holes 2, 4, as illustrated by FIG. 3. It is typically not possible to achieve large and enclosed voids within the cladding 3 without internal etching. This process increases the anisotropic stress acting on the FBG 5 in response to increases in the hydrostatic pressure applied by the fluid 14. In so doing, the sensitivity of the pressure sensor 20 ultimately formed is increased.

The first and second holes 2, 4 are located sufficiently towards the centre of the cladding 3 so that if the internal etching were allowed to continue, the etchant would eventually come into contact with the core 7, which could degrade its optical transmission properties. Further internal etching would then cause the first and second holes 2, 4 to become exposed to the non-compressible fluid 14. The etchant is therefore passed along the first and second holes 2, 4 for a predetermined amount of time so as to increase the diameter of the first and second holes 2, 4 by a controlled amount, without bringing the etchant into contact with the core 7. Typically the diameter of the first and second holes 2, 4 is increased from 10 micrometres to 25-35 micrometres by the internal etching. Depending on the width of the cladding 3, wider first and second holes 2, 4 may be desirable. For example, if the cladding is 280 micrometres in diameter, the first and second holes 2, 4 may be internally etched to achieve respective diameters of around 100 micrometres.

The etchant is then flushed from the first and second holes 2, 4 at step 104, for example using an inert liquid such as water. This liquid may then be ejected from the first and second holes 2, 4, for example using a jet of hot air. After the internal etching, the first and second holes 2, 4 remain enclosed within the cladding 3 and each of the core 7 and the first and second holes 2, 4 remain separate and non-interconnected within the optical waveguide 1. In an alternative embodiment the FBG 5 may be written onto the optical fibre 1 only after the etching process is complete.

Figure 4:
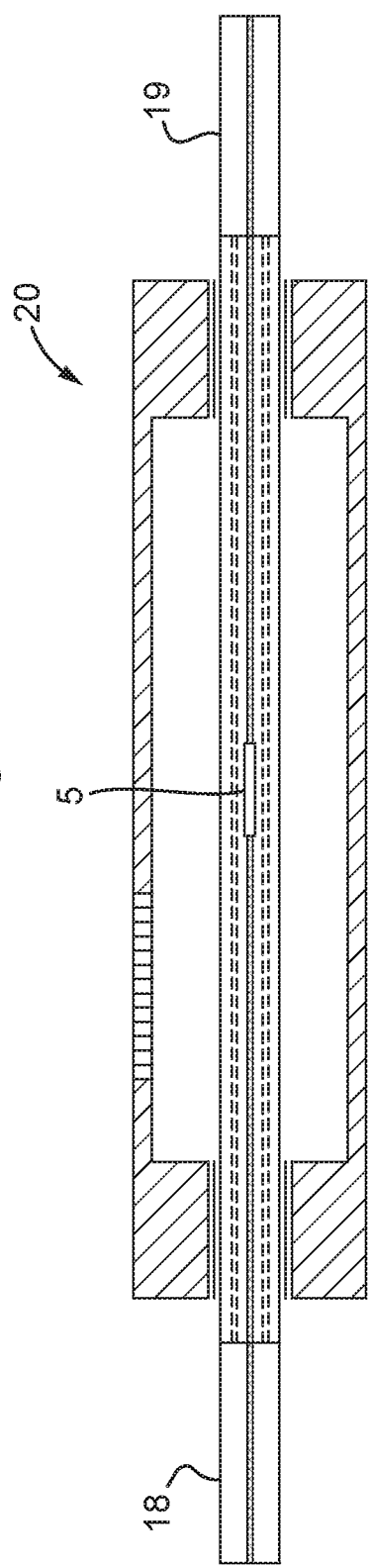
FIG. 4 is a cross-sectional illustration of a side view of the pressure sensor in accordance with any of the described embodiment.

At step 105 the opposing ends of the length of optical fibre 1 held by the grips 13, 15 are spliced onto first and second single mode optical fibres 18, 19 respectively. The pressure sensor 20 of FIG. 4 is thereby formed. Optionally, additional components, such as braces or ducting, may be included to provide mechanical and environmental protection.

The single mode optical fibres 18, 19 are typically solid fibres having a core and a cladding with diameters of 9 and 125 micrometres respectively, and a mode field diameter of approximately 10 micrometres at 1550 nm. These fibres are widely used for transmitting signals reliably over long distances. It is therefore advantageous to couple the optical fibre 1 to such fibres 18, 19 at either end to ensure compatibility with any peripheral components to the system that may be provided and to increase the ease of any additional splicing that may be required for coupling such components to the pressure sensor 20.

Figure 5:
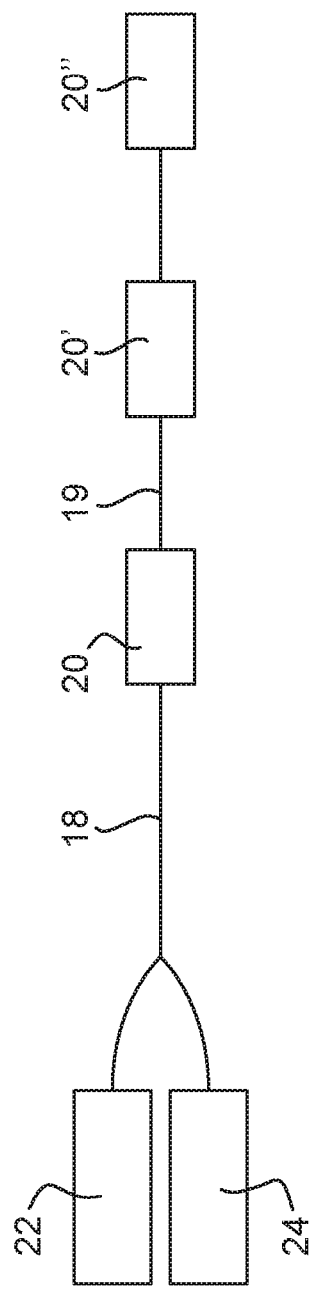
FIG. 5 is a schematic illustration of a system for monitoring pressure in accordance with the first embodiment.

FIG. 5 schematically illustrates a system for monitoring pressure using this pressure sensor 20. The first single mode optical fibre 18 is coupled to a light source 22, in the form of a laser, and a detector 24. An alternative light source may however be used, such as a diode. The second single mode optical fibre 19 is coupled to further similarly constructed pressure sensors 20', 20" such that the pressure may be measured at a plurality of locations along the resulting waveguide. A distal end of the waveguide protruding from the end pressure sensor 20" is connected to a means of suppressing reflections (not shown), such as an optical absorber or an angled cleave. At the opposing proximal end of the waveguide, the light source 22 is configured to inject a pulse of light along the waveguide in a first direction. A portion of this light is then reflected by the FBG provided within each of the pressure sensors 20, 20', 20" and travels in a second direction, opposite to the first direction, until it reaches the detector 24. The wavelength of the reflected light is monitored by the detector 24.

Increases in pressure within each of the pressure sensors 20, 20', 20" will increase the birefringence along the encased portions of optical fibre. This will cause two distinct signals to be reflected at different peak wavelengths by each FBG. The difference in peak wavelength between these signals is measured by the detector 24 and the pressure acting on the sensors 20, 20', 20" is calculated from this. U.S. Pat. No. 5,841,131 provides an example of how the birefringent pressure sensor operates and the pressure may be calculated from changes in a peak wavelength.

An optical fibre-based system is therefore provided for measuring the pressure at a plurality of locations along a single waveguide. Advantageously therefore, if such a system were implemented within a high pressure environment such as within a hydrocarbon well, the number of penetrations through each of the pressure barriers that are required for accommodating the system is limited to one. This is practically easier to implement and reduces the number of potential leak points.

A particular benefit of the above technique is that the cladding 3 is etched whilst the optical fibre 1 is supported within the housing 11 that goes on to form part of the pressure sensor 20. In contrast, if the optical fibre 1 were not supported within the housing 11 during the etching, significant stresses could be applied to the fibre through handling it. For example, if the optical fibre 1 were bent even slightly, the stresses would be concentrated in the region where the cladding 3 was thinnest. It would therefore not be possible to remove as much cladding material via etching without making the fibre susceptible to breaking apart when handled. However, since the etched optical fibre 1 no longer requires further handling in order to incorporate it within the pressure sensor, more cladding may be removed during etching and so the sensitivity of the pressure sensor may be increased.

Figure 6:
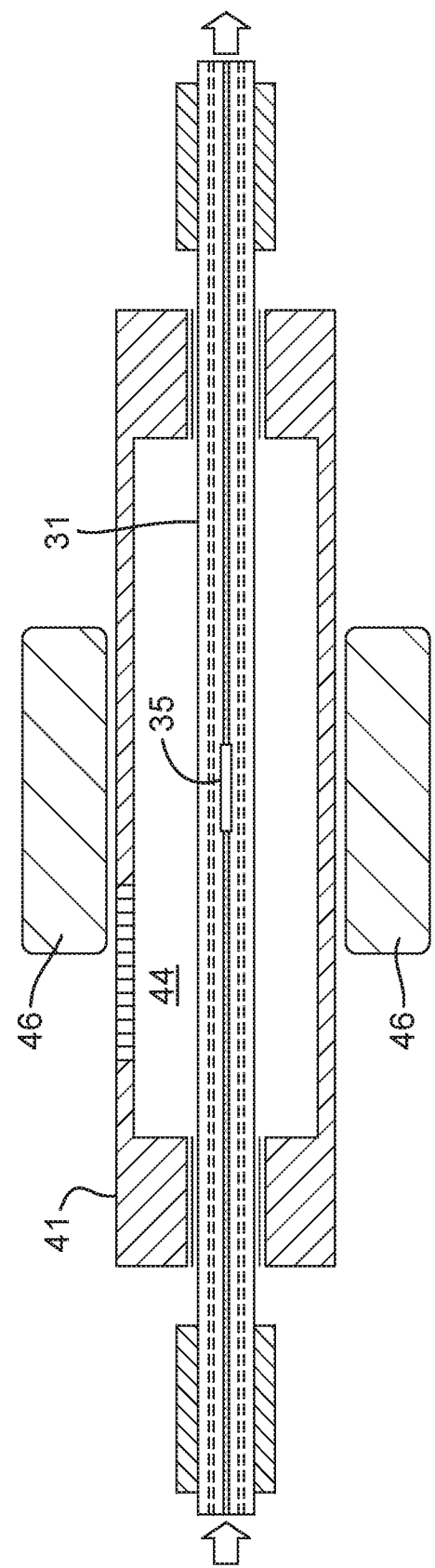
FIG. 6 is a cross sectional illustration of a side view of an optical fibre during internal etching in accordance with a second embodiment.

Further embodiments of the invention will now be discussed which introduce further developments on the first embodiment. Similar components described and illustrated take an identical form to the first embodiment unless stated otherwise. In a second embodiment, illustrated by FIGS. 6 and 7, a localised heat source in the form of a resistive coil 46 is wrapped around the outside of the housing 41. Alternatively the localised heat source may take the form of a Peltier heater or an induction heating coil. Once the chamber has been filled with the substantially non-compressible fluid 44, an electric current is applied to the coil 46 so as to heat a central region of the chamber containing the FBG 35 (in this case via the fluid 44—which provides a heat transfer medium).

When the liquid etchant is then conveyed along the first and second holes 32, 34 at step 103, the etching rate will be increased where the temperature of the cladding 33 is higher. The internal etching may thus be controlled so as to produce enlarged voids 36, 38 within the first and second holes 32, 34 respectively along a specific region that encompasses the FBG 35. The birefringence may thus be increased at this region, without compromising the structural integrity of the remainder of the optical fibre 31. These voids 36, 38 have a diameter of 45 micrometres whereas the remainder of the first and second holes 32, 34 have a diameter of 25 micrometres.

Typically the liquid etchant used is BOE (as before). A useful feature of BOE is the etching rate approximately doubles for every 10 degrees Celsius increase in temperature, within an operating range of 20-80 degrees Celsius. Thus, the increased etching may be carefully predicted in advance in accordance from the temperature profile of the cladding 33. Useful temperature ranges are generally in the region of 20 to 80 degrees Celsius.

Figure 10:
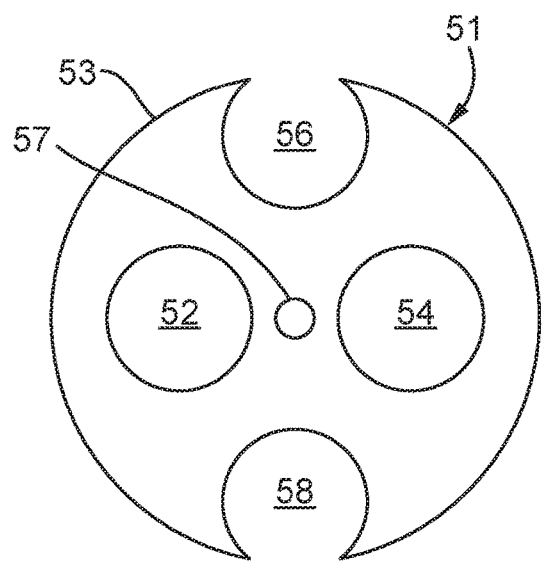
FIG. 10 is a cross-sectional end view of an optical fibre after internal and external etching in accordance with the third embodiment.

A third embodiment of a method for forming a pressure sensor 80 will now be discussed with reference to FIGS. 8-10. This embodiment is similar to the second embodiment in that the internal etching process is assisted by use of a heating element 66. In the third embodiment however external etching of the cladding 53 is additionally performed. In this instance, the birefringence structure further comprises third and fourth holes 56, 58 that extend along the cladding 53 in a direction parallel to the axis of the core 57. Like the first and second holes 52, 54, the third and fourth holes 56, 58 are initially drilled into the preform, which is then drawn to form the optical fibre 51. The third and fourth holes 56, 58 are formed at equal distances from the core 57, on opposing sides of the core 57 and radially outside of the first and second holes 52, 54. The axes of the first and second holes 52, 54 lie within a first plane, and the axes of the third and fourth holes 56, 58 lie within a second plane, wherein the first plane is perpendicular to the second plane.

The third and fourth holes 56, 58 are initially fully enclosed within the cladding 53 such that the cladding has a circular profile (as before). At step 103 however a liquid etchant is introduced into the chamber through an inlet 68 whereupon it comes into contact with the outside of the cladding 53. Typically the etchant is continuously circulated through the chamber via the inlet 68 and an outlet 69 during this stage. The etchant is allowed to etch the cladding 53, generally reducing its diameter, until the cladding material between each of the third and fourth holes 56, 58 and the outside of the optical fibre 51 is removed, thereby exposing the third and fourth holes 56, 58 to the liquid etchant. At this point the optical fibre 51 no longer has a circular profile, when viewed along a plane perpendicular to the core 57. Instead this profile now comprises a partial outline of the third and fourth holes 56, 58, these holes forming respective re-entrant features for the cladding 53. The cladding 53 thereby has a cross-sectional outline in the form of a bow tie profile, as illustrated by FIG. 10.

The liquid etchant will etch the cladding 53 approximately equally around its circumference during the external etching. The first and second holes 52, 54 are provided radially inwards of the third and fourth holes 56, 58 however and so these will remain enclosed by the cladding 53 at the point that the third and fourth holes 56, 58 are exposed. At this moment, the liquid etchant is flushed from the chamber through the outlet 69 so as to prevent unwanted removal of cladding material either between the third and fourth holes 56, 58, or the between either of the first and second holes 52, 54 and the outside of the cladding 53. The substantially non-compressible fluid may be introduced into the chamber via the inlet 68 to help achieve this flushing. The flow of liquid into and out from the chamber via the outlet 69 is indicated by the vertical arrows in FIG. 8. The chamber is then sealed by blocking the inlet 68 and the outlet 69, as shown by FIG. 9.

The housing 61 may therefore advantageously provide the dual-purpose of providing a container for the liquid etchant and then subsequently containing the substantially non-compressible fluid. This improves the simplicity of the method for forming the pressure sensor 80.

Internal etching typically occurs either during the external etching or afterwards, with either the etchant or the substantially non-compressible fluid which surrounds the optical fibre 51 being used as a medium to transfer heat from the heating element 66 to the cladding 53. Optionally no such surrounding fluid is provided during this stage however. After the internal etching, the ends of the optical fibre 51 which trail from the apertures of the housing 61 are spliced onto respective single mode optical fibres 78, 79, as before. Advantageously, unlike the portion of the optical fibre 51 which has been subject to external etching, these ends have a circular profile that corresponds to the profile of the single mode optical fibres 78, 79. These ends will therefore be practically easier to splice together whilst maintaining a good optical coupling. The completed pressure sensor 80 having single mode optical fibres 78, 79 spliced onto either end of the birefringent optical fibre 51 is shown by FIG. 9. Notably, the heating element 66 is removed at this stage since it is no longer required.

Figure 11:
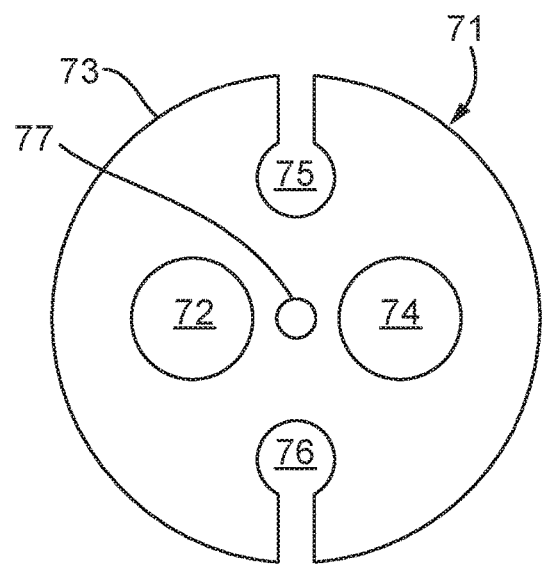
FIG. 11 is a cross-sectional end view of an optical fibre after internal and external etching in accordance with a fourth embodiment.

A cross-sectional end view of an optical fibre 71 in accordance with a fourth embodiment is illustrated by FIG. 11. This embodiment substantially matches the third embodiment however the external etching has been performed using laser ablation rather than by immersing the optical fibre in a liquid etchant. The housing (not shown) may therefore comprise a window for enabling a laser beam to be directed onto the cladding 73 from a position outside of the housing. The laser beam is directed onto opposing sides of the cladding 73 and then moved along the axis of the optical fibre 71 so as to expose the third and fourth holes 75, 76 across a region encompassing the FBG (not shown). Unlike the third embodiment, the external etching does not occur equally around the outside of the cladding 73 and so there is less danger of accidentally exposing the first or second holes 72, 74. The first and second holes 72, 74 may therefore be formed larger than in the third embodiment, which can lead to further increases in the birefringence within the core 77.

Optionally, the same light source may be used to perform two or more of: writing the FBG onto the core 77, heating the cladding 73 during internal etching, ablating the cladding 73 during external etching and transmitting a pulse of light along the core 77 during subsequent pressure monitoring.

A fifth embodiment of a pressure sensor will now be discussed with reference to FIGS. 12 and 13. In this embodiment the optical fibre 91 is internally etched within the housing of the pressure sensor (not shown). No external etching is performed.

Figure 12:
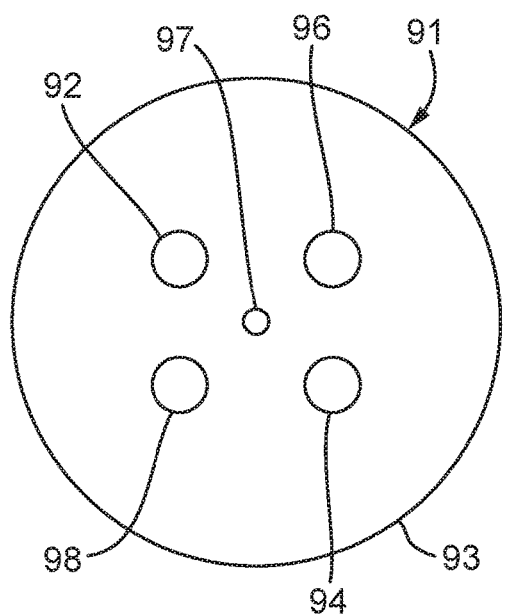
FIG. 12 is a cross-sectional end view of an optical fibre before internal etching in accordance with a fifth embodiment.

Two pairs of parallel holes are initially drilled into the cladding of a pre-form which is then drawn so as to form the optical fibre 91 having a cross-sectional outline shown by FIG. 12. Optical fibre 91 has a birefringence structure comprising a first hole 92, second hole 94, third hole 96 and fourth hole 98—each enclosed within cladding 91 and rotationally dispersed about a central core 97. The holes 92, 94, 96, 98 have approximately the same diameter and are arranged at the same radial distance from the core 97. The birefringence structure is arranged such that, when viewed in a plane having a normal parallel to the core 97, an acute angle is made between the first and fourth holes 92, 98 relative to the core 97, and an acute angle is made between the second and third holes 94, 96 relative to the core 97. An obtuse angle is therefore formed between the first and third holes 92, 96 relative to the core 97, and between the second and fourth holes 94, 98 relative to the core 97.

An optical sensor is formed on the core 97. A portion of the optical fibre 91 comprising the optical sensor is positioned within a chamber having a pressure transfer element, and the chamber is then filled with an inert fluid (as before). A heating element is provided so as to heat the portion of the optical fibre 91 within the chamber via the surrounding fluid.

An internal etching process is then performed during which a liquid etchant is flowed through each of the first, second, third and fourth holes 92, 94, 96, 98 so as to remove a portion of the surrounding cladding 93. A higher etching rate occurs along the heated portion of the optical fibre 91 (as occurred in the second embodiment). The diameter of each of these holes 92, 94, 96, 98 is thereby enlarged until the first hole 92 coalesces with the fourth hole 98, and the second hole 94, coalesces with the third hole 96—each along the heated portion. Care is taken not to merge any portions of the holes that extend outside of the chamber (where the birefringence structure is comparatively weak). At this point the etchant is flushed from the holes 92, 94, 96, 98 so as to prevent the first and third, or second and fourth holes from merging, and to prevent any of the holes 92, 94, 96, 98 from coming into contact with the core 97.

Figure 13:
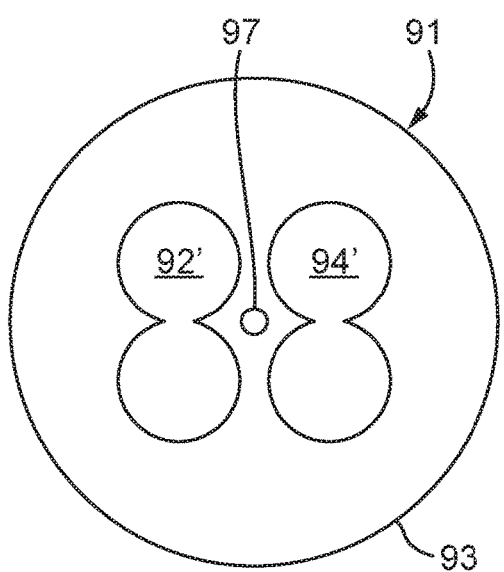
FIG. 13 is a cross-sectional end view of an optical fibre after internal etching in accordance with the fifth embodiment.

A cross sectional view of the resulting structure is shown by FIG. 13. As can be seen, the internal etching process results in the formation of a first etched hole 92' and a second etched hole 94'. These holes 92', 94' are non-circular and approximately dumbbell shaped when viewed in the cross-sectional plane having a normal parallel to the core 97. This dumbbell shape may equivalently be described as "peanut shaped" or generally ovoid comprising two opposing re-entrant portions positioned midway along the major axis.

The core 97 is positioned midway between the centre of the etched holes 92', 94'. The thickness of cladding 93 separating the core 97 from the outside of the optical fibre 91 therefore varies significantly about the rotational axis of the core 97. This thickness is relatively high for the sectors not encompassing the first or second etched holes 92', 94' and relatively low for the sectors encompassing the first or second etched holes 92', 94'. Isotropic forces applied to the outside of the encased portion of optical fibre 91 are therefore converted into anisotropic stress on the core 97 with a high level of asymmetry (without the need for external etching). This can lead to relatively large changes in the birefringence of the optical sensor and so the formation of a pressure sensor having a particularly high sensitivity.

In an alternative embodiment, dumbbell-shaped holes may be formed along the encased portion of optical fibre without flowing an etchant along the third and fourth holes. For example the etchant may be flowed through the first and second holes only until these holes combine with the fourth and third holes respectively.

In a further embodiment (not illustrated) one or more additional holes (in addition to the four already discussed) may be provided within the cladding. These holes will extend parallel to the core and remain enclosed within the cladding after any internal and external etching processes. Desirable levels of birefringence may hence be induced according to these techniques.

In a further embodiment, the core may be pre-formed so as to exhibit birefringence. For example, an elliptical core could be used. The birefringence structure may also comprise stress rods. The rods may be inserted into holes drilled in the preform to form a "PANDA" fibre. Alternatively, doped regions may be provided outside the core to induce anisotropic stress in the core. For example, the preform may comprise regions of the cladding formed of highly-doped silica glass that has a different coefficient of thermal expansion (CTE) from the surrounding cladding. When the fibre cools from the drawing process, this difference in CTE causes different parts of the fibre will contract by different amounts, thereby creating stress-induced birefringence in the core. This forms a "BOWTIE" fibre. The birefringence is then modulated in response to changes in pressure supplied by the substantially non-compressible fluid by the birefringence structure.

The above techniques may be used in any combination with the other embodiments disclosed.

It is envisaged that the pressure sensor and system herein will be particularly useful for acquiring pressure measurements within lubricating and cooling fluid conduits in pumps, motors, compressors and other subsea machinery used by the oil and gas industry. Other potential uses include internal and external measurements of process fluid in Electrical Submersible Pumps for oil recovery. The system typically has a low-mass and does not require protection from electromagnetic interference. This makes it well suited for acquiring pressure readings within aircrafts, in particular along their hydraulic systems. Furthermore, the pressure sensors are non-intrusive, making them well suited for process pressure measurements. Such pressure sensors could therefore be integrated into components such as valves and seals, providing additional functionality and potentially enhancing the effectiveness and safety of process plants.

As will be appreciated, a pressure sensor is therefore provided which offers improved sensitivity over the prior art. This pressure sensor is relatively simple and therefore inexpensive to construct. Furthermore the pressure sensor may be constructed so as to be physically smaller than some prior art sensors. It may also be used as part of a system for monitoring pressure that is resistant to high pressure and temperature environments and requires no additional electrical cabling that could provide potential leak points within high pressure environments.

The invention claimed is:

1. A method for forming a pressure sensor comprising:
providing an optical fibre comprising a core, a cladding surrounding the core, and a birefringence structure for inducing birefringence in the core, wherein the birefringence structure comprises first and second holes enclosed within the cladding and extending parallel to the core;
encasing a portion of the optical fibre comprising the core and the birefringence structure within a chamber, wherein the chamber is defined by a housing comprising a pressure transfer element for equalising pressure between the inside and the outside of the chamber;
providing an optical sensor along the core of the portion of optical fibre;
internally etching the cladding by flowing an etchant through the first and second holes along a length of the portion of optical fibre which comprises the optical sensor so as to increase the width of the first and second holes;
heating the cladding during the internal etching using a localised heat source so as to increase the internal etching rate in a region of the encased portion encompassing the optical sensor; and
filling the chamber with a substantially non-compressible fluid;
wherein the etched cladding is shaped so as to convert an external pressure provided by the non-compressible fluid within the chamber to an anisotropic stress in the optical sensor, wherein the internal etching causes the first and second holes to have a larger cross sectional area along the region of the portion encompassing the optical sensor than along another region of the portion not encompassing the optical sensor.

2. A method according to claim 1, wherein the first and second holes remain enclosed within the cladding after the internal etching.

3. A method according to claim 1, wherein the localised heat source comprises a resistive coil, a Peltier heater or an induction coil.

4. A method according to claim 1, wherein the axes of the first and second holes and the core lie within a common plane.

5. A method according to claim 1, wherein the birefringence structure further comprises third and fourth holes enclosed within the cladding and extending parallel to the core, the method further comprising:
externally etching the cladding along a length of the portion of optical fibre which comprises the optical sensor so as to expose the third and fourth holes.

6. A method according to claim 5, wherein the perimeter of the externally etched cladding comprises a partial outline of the third and fourth holes.

7. A method according to claim 5, wherein said external etching is performed using laser ablation.

8. A method according to claim 7, wherein the housing further comprises a window for transmitting a laser beam directed onto the length of the portion of optical fibre.

9. A method according to claim 5, wherein external etching comprises flowing an etching fluid into the chamber and immersing the outside of the cladding in said etching fluid until the third and fourth holes are exposed.

10. A method according to claim 9, further comprising flushing the etching fluid from the chamber prior to filling the chamber with the substantially non-compressible fluid.

11. A method according to claim 5, wherein the axes of the core and the first and second holes lie within a first plane, and wherein the axes of the core and the third and fourth holes lie within a second plane, the second plane being different from the first plane.

12. A method according to claim 5, wherein the birefringence structure further comprises one or more additional holes enclosed within the cladding and extending parallel to the core, wherein the additional holes remain enclosed within the cladding after said internal and external etching.

13. A method according to claim 1, wherein the birefringence structure further comprises third and fourth holes enclosed within the cladding and extending parallel to the core, wherein the core is arranged between the first hole and the second hole, and wherein the core is arranged between the third hole and the fourth hole, and wherein the internal etching causes the first hole to merge with the fourth hole and the second hole to merge with the third hole.

14. A method according to claim 13, wherein internally etching the cladding comprises flowing an etchant through the third and fourth holes along a length of the portion of optical fibre which comprises the optical sensor so as to increase the width of the third and fourth holes.

15. A method according to claim 1, wherein the core is pre-formed to exhibit birefringence.

16. A method according to claim 1, further comprising splicing one or each end of the optical fibre protruding from the housing with a single-mode optical fibre.

17. A pressure sensor comprising:
a housing defining a chamber, the housing comprising a pressure transfer element for equalising pressure between the inside and the outside of the chamber;
a substantially non-compressible fluid contained within the chamber; and
an optical fibre, wherein a portion of the optical fibre is encased within the chamber, the portion comprising a core, an optical sensor provided along the core, a cladding surrounding the core, and a birefringence structure for inducing birefringence in the core, wherein the birefringence structure comprises first and second holes enclosed within the cladding and extending parallel to the core, and wherein the first and second holes have a larger cross sectional area along a region of the portion encompassing the optical sensor than along another region of the portion not encompassing the optical sensor.

18. A pressure sensor according to claim 17, further comprising an etching member for enabling etching of the cladding within the chamber.

19. A pressure sensor according to claim 18, wherein the etching member comprises a conduit configured to enable a flow of etchant to and from the chamber.

20. A pressure sensor according to claim 18, wherein the cladding has a non-elliptical outline as viewed in a plane having a normal parallel to the axis of the core.

21. A pressure sensor according to claim 20, wherein the outline comprises two re-entrant features.

22. A pressure sensor according to claim 17, wherein the first and second holes are dumbbell shaped along the portion encompassing the optical sensor, when viewed in a plane having a normal parallel to the core.

23. A pressure sensor according to claim 17, wherein the optical fibre protrudes from one or each end of the encased portion.

24. A pressure sensor according to claim 17, wherein the optical sensor comprises a Fibre Bragg Grating.

25. A pressure sensor according to claim 17, wherein the pressure transfer element is a flexible member.

26. A pressure sensor according to claim 17, wherein the pressure transfer element is an orifice.

27. A system for monitoring pressure comprising:
a pressure sensor according to claim 17;
a light source optically coupled to the encased portion of optical fibre; and
a detector configured to receive light transmitted by the light source along the optical fibre.

28. A system according to claim 27, wherein the optical sensor is configured to simultaneously reflect light at two peak wavelengths, and wherein the detector is configured to monitor the pressure of the non-compressible fluid from the difference between the two peak wavelengths.

* * * * *